(12) United States Patent
Rhyu et al.

(10) Patent No.: US 12,445,697 B2
(45) Date of Patent: Oct. 14, 2025

(54) METHOD FOR PROCESSING SPATIAL CONTENT AND ELECTRONIC DEVICE PERFORMING SAME

(71) Applicant: Samsung Electronics Co., Ltd., Gyeonggi-do (KR)

(72) Inventors: Sungryeul Rhyu, Gyeonggi-do (KR); Eric Yip, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 73 days.

(21) Appl. No.: 18/555,632

(22) PCT Filed: Apr. 15, 2022

(86) PCT No.: PCT/KR2022/005492
§ 371 (c)(1),
(2) Date: Oct. 16, 2023

(87) PCT Pub. No.: WO2022/220650
PCT Pub. Date: Oct. 20, 2022

(65) Prior Publication Data
US 2024/0214649 A1    Jun. 27, 2024

(30) Foreign Application Priority Data

Apr. 16, 2021  (KR) .................. 10-2021-0050019

(51) Int. Cl.
*H04N 21/84*    (2011.01)
*H04N 21/845*   (2011.01)

(52) U.S. Cl.
CPC ......... *H04N 21/84* (2013.01); *H04N 21/8456* (2013.01)

(58) Field of Classification Search
None
See application file for complete search history.

(56) References Cited

U.S. PATENT DOCUMENTS

| | | |
|---|---|---|
| 7,979,886 B2 | 7/2011 | Frojdh et al. |
| 10,390,107 B2 | 8/2019 | Rhyu et al. |

(Continued)

FOREIGN PATENT DOCUMENTS

| | | |
|---|---|---|
| JP | 6435585 | 12/2018 |
| KR | 10-2018-0109782 | 10/2018 |

(Continued)

OTHER PUBLICATIONS

PCT/ISA/210, International Search Report dated Jul. 25, 2022 issued in counterpart application No. PCT/KR2022/005492, 5 pages.

(Continued)

*Primary Examiner* — James R Marandi
(74) *Attorney, Agent, or Firm* — The Farrell Law Firm, P.C.

(57) ABSTRACT

A method, performed by a scene content transmitter, of processing scene content, according to an embodiment of the present disclosure, may include constructing at least one track data associated with a plurality of scene descriptions constituting the scene content, wherein the at least one track data includes a first sample including a scene description at a first time point and a second sample associated with a scene description at a second time point after the first time point and based on the first sample, and transmitting the at least one track data to a scene content receiver, and a header of the second sample may include information related to a target referenced by the second sample.

15 Claims, 14 Drawing Sheets

(56) References Cited

U.S. PATENT DOCUMENTS

| | | | |
|---|---|---|---|
| 11,070,893 B2 | 7/2021 | Denoval et al. | |
| 2002/0170070 A1* | 11/2002 | Rising, III | H04N 7/16 |
| | | | 348/E7.054 |
| 2014/0126881 A1 | 5/2014 | Yoneda et al. | |
| 2018/0184150 A1 | 6/2018 | Cohen et al. | |
| 2021/0235058 A1 | 7/2021 | Yip et al. | |

FOREIGN PATENT DOCUMENTS

| | | |
|---|---|---|
| KR | 10-2019-0117675 | 10/2019 |
| WO | WO 2020/145668 | 7/2020 |

OTHER PUBLICATIONS

PCT/ISA/237, Written Opinion dated Jul. 25, 2022 issued in counterpart application No. PCT/KR2022/005492, 3 pages.

* cited by examiner

FIG. 12

| Scene description | 1 | 2 | 3 | 4 | 5 | 6 | 7 | |
|---|---|---|---|---|---|---|---|---|
| Version | a,b,c | a,b,c,A | a,b,c,A,B | a,b,c,A,B,C | a,b,c,A,C | b,c,A,C | c,A,C | |
| SD size | 5 | 7 | 9 | 11 | 9 | 7 | 5 | 53 |

FIRST COMPARATIVE EXAMPLE

| SampleID | 1 | 2 | 3 | 4 | 5 | 6 | 7 | |
|---|---|---|---|---|---|---|---|---|
| SamplePayload | a,b,c | +A | +B | +C | -B | -a | -b | |
| | | | +A,+B | | +A,+C | | -a,-b,+A,+C | |
| Sample size | 5 | 2 | 7 | 2 | 7 | 2 | 13 | |
| Total size | 5 | 2 | 7 | 2 | 7 | 2 | 13 | 38 |

SECOND COMPARATIVE EXAMPLE
Track 1

| SampleID | 1 | 2 | 3 | 4 | 5 | 6 | 7 | |
|---|---|---|---|---|---|---|---|---|
| SamplePayload | a,b,c | +A | +B | +C | -B | -a | -b | |
| Sample size | 5 | 2 | 2 | 2 | 2 | 2 | 2 | |

Track 2

| SampleID | | | 1 | | 2 | | 3 | |
|---|---|---|---|---|---|---|---|---|
| SamplePayload | | | a,b,c,A,B | | a,b,c,A,C | | c,A,C | |
| Sample size | | | 9 | | 9 | | 5 | |
| Total size | 5 | 2 | 11 | 2 | 11 | 2 | 7 | 40 |

FIRST EMBODIMENT
Track 1

| SampleID | 1 | 2 | 3 | 4 | 5 | 6 | 7 | |
|---|---|---|---|---|---|---|---|---|
| SamplePayload | a,b,c | +A | +B | +C | -B | -a | -b | |
| Sample size | 5 | 2 | 2 | 2 | 2 | 2 | 2 | |

Track 2

| SampleID | | | 1 | | 2 | | 3 | |
|---|---|---|---|---|---|---|---|---|
| refType | | | DE | | DS | | IDS | |
| refid | | | Entry1 | | Sample 1 | | - | |
| SamplePayload | | | +A,+B | | -B,+C | | c,A,C | |
| Sample size | | | 5 | | 5 | | 5 | |
| Total size | 5 | 2 | 7 | 2 | 7 | 2 | 7 | 32 |

METHOD FOR PROCESSING SPATIAL CONTENT AND ELECTRONIC DEVICE PERFORMING SAME

TECHNICAL FIELD

The present disclosure relates to a method of processing scene content provided by a communication system and an electronic device performing the method. More particularly, the present disclosure relates to a method of efficiently providing an information fragment needed to play scene content from an arbitrary time point, and an electronic device performing the method.

BACKGROUND ART

A prior art as the background of the present disclosure may include scene content consisting of two-dimensional (2D) objects (e.g. images) or three-dimensional (3D) objects in a 3D space, a scene description technology for placing the objects at desired locations, and a scene description extension technology for using media (e.g., video) where objects in scene information change in content over time. Alternatively, a technology for obtaining scene descriptions constituting scene content over time and providing a scene description or a scene description fragment (or a patch) needed to play the scene content from an arbitrary time point.

When a playback device for playing scene content attempts to play generated scene content from an arbitrary time point, the playback device may locate information fragments needed to construct a scene description at the arbitrary time point and read the information fragments. The playback device may execute commands included in the information fragments and construct (or reconstruct) the scene description. Through this, the playback device may play back objects in a space according to the constructed scene description.

A scene content providing device may generate a scene description at an initial time point, which constitutes scene content. Furthermore, the scene content providing device may generate a history of changes to scene descriptions that change over time as differences with respect to neighboring scene descriptions, and provide them as information fragments. For example, a scene description at a time point T1 may be a V1 version of scene description consisting of A, B, and C. Also, a scene description at a time point T2 after the time point T1 may be a V2 version of scene description consisting of A, B, C. and D. In this case, with respect to the scene description at the time point T2, a command to add D which is a difference from the scene description at the time point T1 may be provided as a scene description fragment. The playback device that wants to play the scene content from the time point T2 may read the V1 version of scene description at the time point T1 and read the scene description fragment corresponding to the scene description at the time point T2. The playback device may execute the command (the command to add D) as the scene description fragment at the time point T2 on the V1 version of scene description. In this way, the playback device may obtain the V2 version of scene description and play scene content from the time point T2. Subsequently, the playback device may obtain a scene description at a time point T3 in order to play scene content corresponding to the time point T3 after the time point T2. For example, a scene description fragment at the time point T3 may be information related to a difference from the scene description at the time point T2. The playback device may obtain the scene description at the time point T3 by reading the scene description fragment at the time point T3 after obtaining the scene descriptions at the time point T1 and the time point T2 as described above.

If the playback device wants to construct scene content from an arbitrary time point that is significantly temporally different from the time point T1, the playback device may need to read all scene description fragments from the time point T1 to the corresponding time point and sequentially execute commands in all the scene description fragments. In this case, the larger the difference between the arbitrary time point at which playback is to start and the time point T1, the more information may need to be processed and the more commands may need to be executed, thereby resulting in a longer processing time.

DISCLOSURE

Technical Problem

The present disclosure relates to a method of efficiently providing a scene description and a scene description fragment needed to play scene content provided by a communication system from an arbitrary time point.

Technical Solution

According to an embodiment of the present disclosure, a method, performed by a scene content transmitter, of processing scene content may include constructing at least one track data associated with a plurality of scene descriptions constituting the scene content, wherein the at least one track data includes a first sample including a scene description at a first time point and a second sample associated with a scene description at a second time point after the first time point and based on the first sample, and transmitting the at least one track data to a scene content receiver, and a header of the second sample may include information related to a target referenced by the second sample.

According to an embodiment of the present disclosure, a method, performed by a scene content receiver, of processing scene content may include receiving at least one track data associated with a plurality of scene descriptions constituting the scene content, wherein the at least one track data may include a first sample including a scene description at a first time point and a second sample associated with a scene description at a second time point after the first time point and based on the first sample, and a header of the second sample may include information related to a target referenced by the second sample.

According to an embodiment of the present disclosure, a method, performed by a scene content transmitter, of processing scene content may include transmitting, to a scene content receiver, first track data included in track data associated with a plurality of scene descriptions constituting the scene content, wherein the first track data includes a first sample including a scene description at a first time point and a plurality of samples respectively corresponding to a plurality of time points after the first time point, and transmitting, to the scene content receiver, second track data included in the track data, wherein the second track data includes a first type sample associated with a scene description at a second time point after the first time point, a second type sample associated with a scene description at a third time point after the second time point, and a third type sample associated with a scene description at a fourth time point. The plurality of samples may respectively include difference commands, each difference command indicating a difference between a scene description at a corresponding time point and a scene description at a time point immediately preceding the corresponding time point, the first type sample may include a difference command indicating a difference between a specified scene description and the scene description at the second time point, the second type sample may include a difference command indicating a difference between the scene description at the second time point and the scene description at the third time point, and the third type sample may include the scene description at the fourth time point.

According to an embodiment of the present disclosure, a method, performed by a scene content receiver, of processing scene content may include receiving, from a scene content transmitter, first track data included in track data associated with a plurality of scene descriptions constituting the scene content, wherein the first track data includes a first sample including a scene description at a first time point and a plurality of samples respectively corresponding to a plurality of time points after the first time point, and receiving, from the scene content transmitter, second track data included in the track data, wherein the second track data includes a first type sample associated with a scene description at a second time point after the first time point, a second type sample associated with a scene description at a third time point after the second time point, and a third type sample associated with a scene description at a fourth time point. The plurality of samples may respectively include difference commands, each difference command indicating a difference between a scene description at a corresponding time point and a scene description at a time point immediately preceding the corresponding time point, the first type sample may include a difference command indicating a difference between a specified scene description and the scene description at the second time point, the second type sample may include a difference command indicating a difference between the scene description at the second time point and the scene description at the third time point, and the third type sample may include the scene description at the fourth time point.

Advantageous Effects

A method and a scene content providing device according to various embodiments of the present disclosure are capable of efficiently providing information fragments necessary for playback of scene content provided by a communication system from an arbitrary time point.

DESCRIPTION OF DRAWINGS

FIG. 12 is a diagram illustrating the effects of methods of processing scene content, according to an embodiment.

With respect to description of the drawings, the same or similar reference numerals may be used for the same or similar components.

MODE FOR INVENTION

Figure 1A:
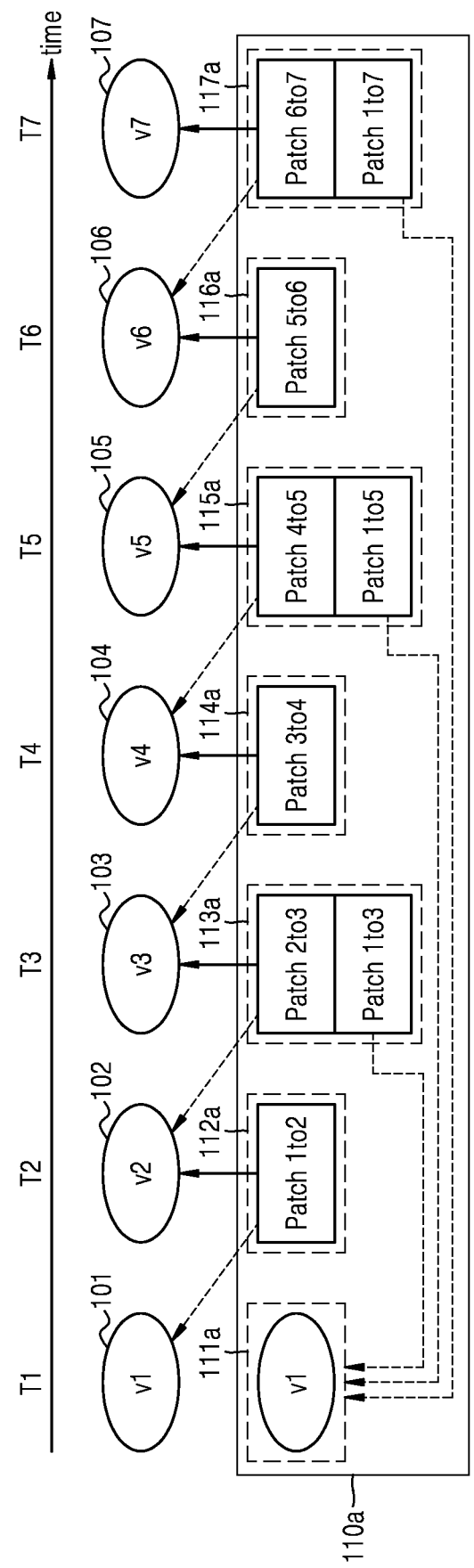
FIG. 1A illustrates scene descriptions and scene description fragments for transmitting scene content, according to a first comparative example.

It should be understood that various embodiments in this document and terms used therein are not intended to limit the technical features described herein to particular embodiments and include various modifications, equivalents, or substitutions of the embodiments. With regard to the description of the drawings, like reference numerals may be used to represent like or related elements. A singular form of a noun corresponding to an item may include one or a plurality of the items unless the context clearly indicates otherwise. As used herein, each of the phrases such as "A or B," "at least one of A and B, "at least one of A or B," "A, B, or C," "at least one of A, B, and C," and "at least one of A, B, or C" may include any one of the items listed together in a corresponding one of the phrases, or all possible combinations thereof. Terms such as "first," "second," etc. may be used simply to distinguish an element from other elements and do not limit the elements in any other respect (e.g., importance or order). It will be understood that when an element (e.g., a first element) is referred to, with or without the term "functionally" or "communicatively", as being "coupled" or "connected" to another element (e.g., a second element), the element may be coupled to the other element directly (e.g., in a wired manner), wirelessly, or via a third element.

As used in various embodiments of this document, the term "module" may include a unit implemented in hardware, software, or firmware, and may be used interchangeably with another term such as logic, logic block, component, or circuitry. A module may be an integrally formed component, or a minimum unit or a part of the component configured to perform one or more functions. For example, according to an embodiment, the module may be implemented in a form of an application-specific integrated circuit (ASIC).

Various embodiments set forth herein may be implemented as software including one or more instructions stored in a storage medium readable by a machine. For example, a processor of the machine may call at least one of the stored one or more instructions from the storage medium and execute the called at least one instruction. This enables the machine to be operated to perform at least one function according to the called at least one instruction. The one or more instructions may include code generated by a complier or code executable by an interpreter. The machine-readable storage medium may be provided in the form of a non-transitory storage medium. In this regard, the term 'non-transitory' only means that the storage medium is a tangible device and does not include a signal (e.g., an electromagnetic wave), and the term does not differentiate between where data is semi-permanently stored in the storage medium and where the data is temporarily stored in the storage medium.

According to an embodiment, methods according to various embodiments disclosed in the present document may be included in a computer program product when provided. The computer program product may be traded, as a product, between a seller and a buyer. The computer program product may be distributed in the form of a machine-readable storage medium (e.g., compact disc read-only memory (CD-ROM) or distributed (e.g., downloaded or uploaded) on-line via an application store (e.g., Google™ Play Store™) or directly between two user devices (e.g., smartphones). For online distribution, at least a part of the computer program product may be at least transiently stored or temporally generated in the machine-readable storage medium such as memory of a server of a manufacturer, a server of an application store, or a relay server.

According to various embodiments, each (e.g., a module or a program) of components described below may include a single entity or a plurality of entities, some of which may be separately placed in other components. According to various embodiments, one or more of the components or one or more operations may be omitted, or one or more other components or operations may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments, operations performed by a module, a program, or another component may be carried out sequentially, in parallel, repeatedly, or heuristically, or one or more of the operations may be executed in a different order or omitted, or one or more other operations may be added.

FIG. 1A illustrates scene descriptions and scene description fragments for transmitting scene content, according to a first comparative example.

Referring to FIG. 1A, a first comparative example for transmitting scene content is illustrated. The scene content may be constructed to include scene descriptions 101, 102, 103, 104, 105, 106, and 107 respectively corresponding to time points T1 to T7. Transmission of the scene content may be accomplished through transmission of first track data 110*a*. The first track data 110*a* may include a plurality of samples 111*a*, 112*a*, 113*a*, 114*a*, 115*a*, 116*a*, and 117*a* including scene description fragments. As shown in FIG. 1A, scene description fragments corresponding to each time point may include a scene description fragment representing a difference from a scene description at an immediately preceding time point, and may include a scene description fragment representing a difference from the scene description at the time point T1. Scene description fragments may also be referred to as patches, and for example, a scene description fragment representing a difference between the scene description at the time point T1 and the scene description at the time point T2 may be represented as patch 1 to 2.

In an embodiment, a playback device that wants to play the scene content from the time point T5 may read a scene description fragment included in the sample 111*a* to obtain a V1 version of scene description 101 at the time point T1, and read a scene description fragment corresponding to the time point T5 included in the sample 115*a*. The playback device may obtain a V5 version of scene description 105 by executing a command in a scene description fragment corresponding to the time point T5 on the V1 version of scene description 101, e.g., by using information about a difference between the V1 version of scene description 101 and the V5 version of scene description 105.

Figure 1B:
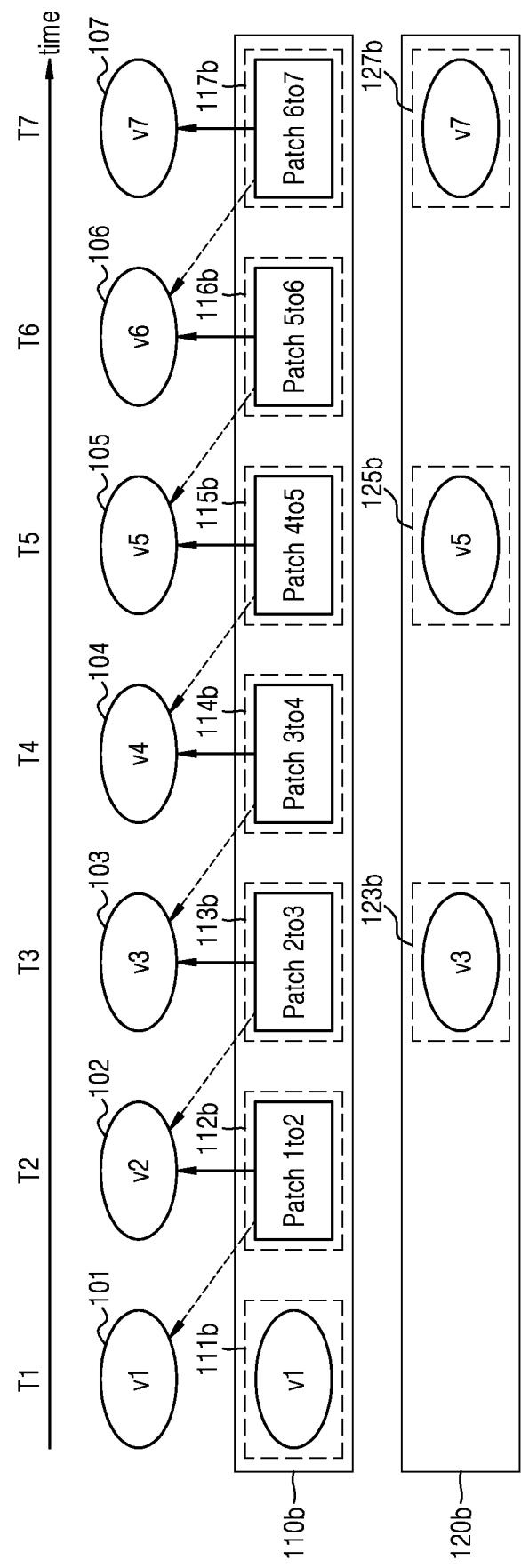
FIG. 1B illustrates scene descriptions and scene description fragments for transmitting scene content, according to a second comparative example.

FIG. 1B illustrates scene descriptions and scene description fragments for transmitting scene content, according to a second comparative example.

Referring to FIG. 1B, a first comparative example for transmitting scene content is illustrated. The scene content may include scene descriptions 101, 102, 103, 104, 105, 106, and 107 respectively corresponding to time points T1 to T7. Transmission of the scene content may be accomplished through transmission of first track data 110*b* and second track data 120*b*. The first track data 110*b* and the second track data 120*b* may include a plurality of samples 111*b*, 112*b*, 113*b*, 114*b*, 115*b*, 116*b*, 117*b*. 123*b*, 125*b*, and 127*b* including scene description fragments. As shown in FIG. 1B, scene description fragments included in the first track data 110*b* may each include a scene description fragment representing a difference between a scene description at a corresponding time point and a scene description at its immediately preceding time point. The samples 123*b*, 125*b*, 127*b* included in the second track data 120*b* may respectively include scene description fragments for the scene descriptions 103, 105, 107 at the corresponding time points. Each of the scene description fragments included in the second track data 120*b* does not represent a difference from another scene description but is information about the intact scene description.

In an embodiment, a playback device that wants to play the scene content from the time point T5 may play the scene content from the time point T5 by directly obtaining the scene description 105 at the time point T5 without the need to obtain a scene description corresponding to another time point, e.g., the scene description 101 corresponding to the time point T1.

Figure 2A:
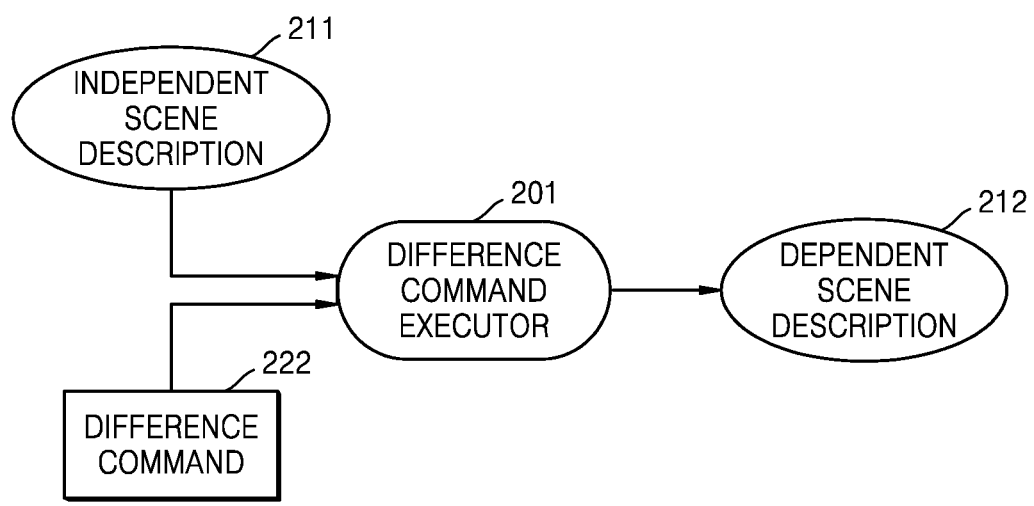
FIG. 2A illustrates a relationship between an independent scene description (ISD) and a dependent scene description (DSD), according to various embodiments.
Figure 2B:
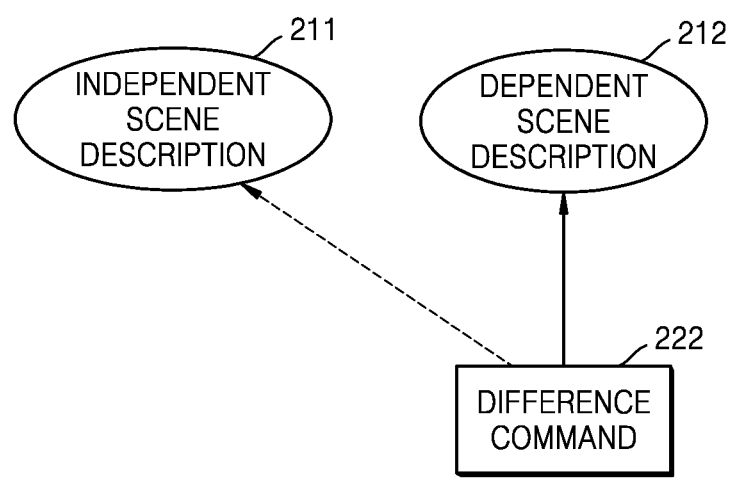
FIG. 2B illustrates a method of representing a relationship between the ISD and the DSD, according to various embodiments.

FIG. 2A illustrates a relationship between an independent scene description (ISD) and a dependent scene description (DSD), according to various embodiments. FIG. 2B illustrates a method of representing the relationship between the ISD and the DSD, according to various embodiments.

Referring to FIGS. 2A and 2B, an ISD 211 and a DSD 212 are shown. In an embodiment, the ISD 211 may be understood as a scene description generated regardless of execution of a difference command 222. In an embodiment, the DSD 212 may be understood as a scene description generated by executing the difference command 222 on the ISD 211.

A scene description may be understood as information that constitutes scene content. The scene description may be written to place objects in space. Writing a scene description may be understood as being the same as or similar to generating a scene description. In various embodiments, a scene description may be generated by referencing objects on scene content. An object referenced by the scene description may be a two-dimensional (2D) object or a three-dimensional (3D) object. In various embodiments, the two dimensions and the three dimensions include dimensions in visual and auditory representations. For example, an object may include an image, a video, or computer graphics as a visual object, and include an audio or audio component as an auditory object.

A scene description may correspond to each time point over the course of time. For example, if scene content supports a rate of 60 frames per second, scene content corresponding to a one-second interval may include 60 scene descriptions, each corresponding to a time point defined every ⅟₆₀th of a second. In various embodiments, if the scene content supports a rate of 60 frames per second, scene content corresponding to a one-second interval may include 30 scene descriptions or 20 scene descriptions. For example, the number of scene descriptions included in scene content may be based on a frame rate supported by the scene content.

A scene description corresponding to each time point over the course of time may be the same as or different from a scene description corresponding to a neighboring time point. If a scene description corresponding to a specific time point is different from a scene description corresponding to the immediately preceding time point, differences between these neighboring scene descriptions may include changes in the configuration, information, or attributes of an object already registered in the scene description, such as a position, an orientation, etc. 0 of the object. In addition, the differences between the neighboring scene descriptions may include addition of a new object or deletion of an existing object.

From a transmission or storage perspective, if at least a portion of the configuration of scene descriptions at different time points is the same, it may be inefficient to transmit or store the entire scene description including the same portion. Accordingly, for a certain scene description configured to reference a scene description at a given time point, only information about a difference from the referenced scene description may be transmitted or stored. In this case, the certain scene description may be derived from the referenced scene description and the differences from the referenced scene description.

Referring to FIGS. 2A and 2B, among different scene descriptions, the ISD 211 may be understood as a referenced scene description in relation to the DSD 212, and understood as independent information that does not refer to another scene description. The DSD 212 may be understood as dependent information because it refers to the ISD 211. In addition, the difference command 222 indicating a difference between the DSD 212 and the ISD 211 may be understood as referring to the ISD 211 and as dependent information. The ISD 211 and the difference command 222 may be provided as input to the difference command executor 201, and as a result, the DSD 212 may be derived.

Furthermore, the relationship among the ISD 211, the DSD 212, and the difference command 222 may be indicated by solid and dashed arrows, as shown in FIG. 2B. For example, a scene description connected with the dashed arrow from the difference command 222 may be understood as a referenced scene description (i.e., the ISD 211) on which the difference command 222 depends. For example, the scene description connected with the solid arrow originating from the difference command 222 may be understood as the DSD 212 that is derived as a result of the difference command 222 being executed on the referenced scene description.

Figure 3:
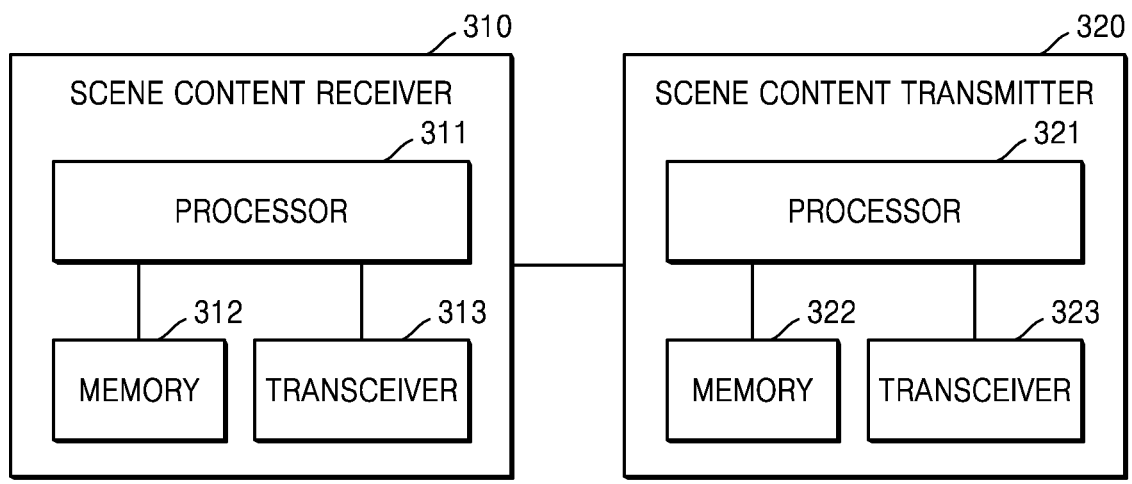
FIG. 3 is a block diagram of configurations of a scene content receiver and a scene content transmitter, according to an embodiment.

FIG. 3 is a block diagram of configurations of a scene content receiver and a scene content transmitter, according to an embodiment.

Referring to FIG. 3, a scene content receiver 310 may include a processor 311, a memory 312, and a transceiver 313, and a scene content transmitter 320 may include a processor 321 and a memory 322, and a transceiver 323. In various embodiments, the configurations of the scene content receiver 310 and the scene content transmitter 320 are not limited to those illustrated in FIG. 3. For example, the scene content receiver 310 or the scene content transmitter 320 may further include components not shown in FIG. 3. In another example, at least some of the processor 311 or 321, the memory 312 or 322, and the transceiver 313 or 323 included in the scene content receiver 310 or the scene content transmitter 320 may be implemented in the form of a single chip.

According to an embodiment, the scene content receiver 310 may be understood as the same as a scene content playback device, a playback device, a receiving device, or the like.

The processor 311 may control a series of processes related to operations of the scene content receiver 310. For example, the processor 311 may control an operation of obtaining samples from received first track data or second track data, or reading and processing the samples. In another example, the processor 311 may control an operation of reconstructing or obtaining a scene description by using obtained samples, or accessing scene content at an arbitrary time point. The processor 311 may be configured as one or more processors, and may perform control of the above-described operations by executing a program stored in the memory 312.

The memory 312 may store data received by the scene content receiver 310 or data processed by the processor 311, and store programs related to the operations of the processor 311. The memory 312 may include storage media such as ROM, random access memory (RAM), hard discs, CD-ROM, or digital video discs (DVDs), or a combination of the storage media. The memory 312 may be configured as one or more memories.

The transceiver 313 may transmit and receive signals to and from a device external to the scene content receiver 310, such as the scene content transmitter 320. The transmitted and received signals may include the first track data and the second track data.

According to an embodiment, the scene content transmitter 320 may be understood as the same as a scene content providing device, a scene content generating device, a transmitting device, or the like.

The processor 321 can control a series of processes related to operations of the scene content transmitter 320. For example, the processor 321 may control an operation of generating scene descriptions that constitute scene content or generating information representing a difference by comparing scene descriptions with each other. In another example, the processor 321 may control an operation of generating first track data or second track data by using scene descriptions and difference commands, or transmitting the generated first track data or second track data. The processor 321 may be configured as one or more processors, and perform control of the above-described operations by executing a program stored in the memory 322.

The memory 322 may store data processed by the processor 321 or data to be transmitted outside by the scene content transmitter 320, and store programs related to the operations of the processor 321. The memory 322 may include storage media such as ROM, RAM, hard discs, CD-ROM, or DVDs, or a combination of the storage media. The memory 322 may be configured as one or more memories.

The transceiver 323 may transmit and receive signals with a device external to the scene content transmitter 320, such as the scene content receiver 310. The transmitted and received signals may include the first track data and the second track data.

Figure 4:
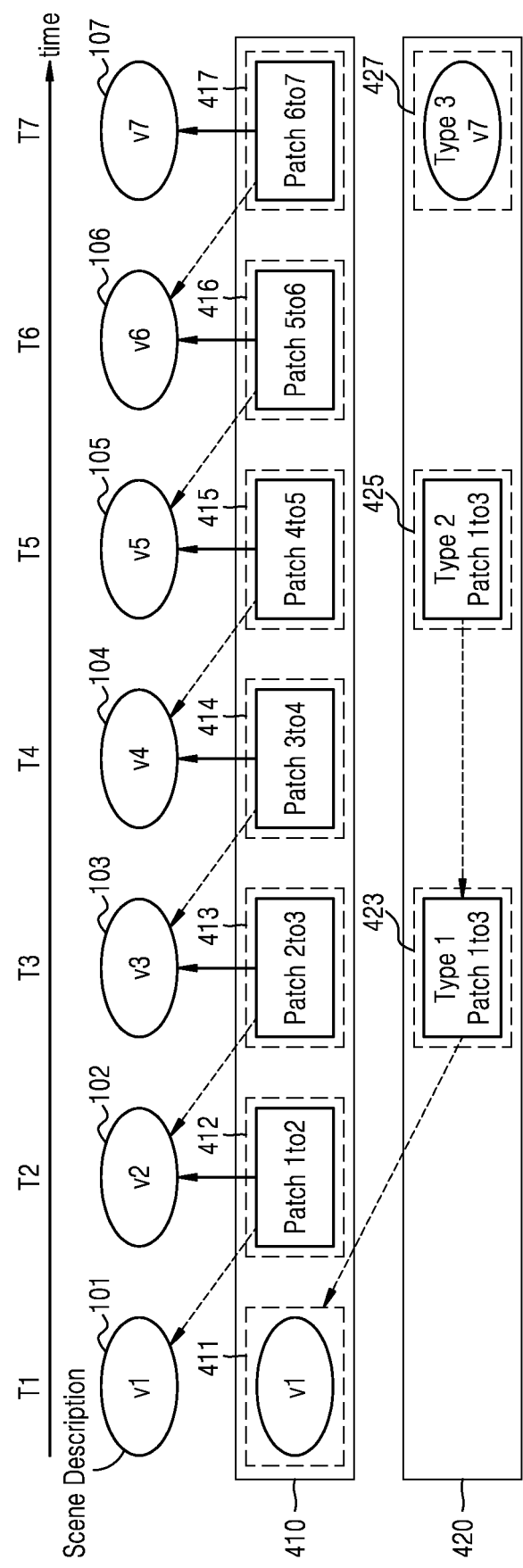
FIG. 4 illustrates scene descriptions and scene description fragments for transmitting scene content, according to an embodiment.

FIG. 4 illustrates scene descriptions and scene description fragments for transmitting scene content, according to an embodiment.

Referring to FIG. 4, the scene content may include scene descriptions 101, 102, 103, 104, 105, 106, and 107 respectively corresponding to time points T1 to T7. According to an embodiment, transmission of scene content from a scene content transmitter to a scene content receiver may be accomplished through transmission of first track data 410 and second track data 420.

According to an embodiment, the first track data 410 is data associated with a plurality of scene descriptions 101, 102, 103, 104, 105, 106, and 107 constituting the scene content, and may include a plurality of samples 411, 412, 413, 414, 415, 416, and 417 respectively corresponding to a plurality of time points. The plurality of samples 411, 412, 413, 414, 415, 416, and 417 may each include a scene description fragment. For example, the first track data 410 may include a sample 411 corresponding to a time point T1 (i.e., a first time point), and the sample 411 may include the scene description 101 at the time point T1 as a scene description fragment. In another example, the first track data may include a sample 412 corresponding to a time point T2, and the sample 412 may include a difference command at the time point T2 as a scene description fragment. The difference command at the time point T2 may represent a difference between the scene description 102 at the time point T2 and the scene description 101 at the time point T1. That is, the difference command at the time point T2 may refer to the scene description 101 at the time point T1 to indicate a change in the scene description 102 at the time point T2. In another example, the first track data 410 may include a sample 413 corresponding to a time point T3, and the sample 413 may include a difference command at the time point T3, i.e., a difference command representing a difference between the scene description 103 at the time point T3 and the scene description 102 at the time point T2.

According to an embodiment, the second track data 420 is data associated with the plurality of scene descriptions 101, 102, 103, 104, 105, 106, and 107 constituting the scene content, and may include a plurality of samples 423, 425, and 427 respectively corresponding to some of the plurality of time points. For example, the second track data 420 may include a first type sample 423, a second type sample 425, and a third type sample 427.

According to an embodiment, the first type sample 423 may be associated with a scene description at a second time point (e.g., the time point T3) after the first time point (e.g., the time point T1). Although FIG. 4 shows that the first type sample 423 is associated with the scene description 103 at the time point T3, it is not limited thereto, and may also be associated with a scene description corresponding to another time point after the first time point (e.g., the time point T1). According to an embodiment, the first type sample 423 may include a difference command representing a difference between the scene description 103 at the second time point, such as the time point T3, associated with the first type sample 423, and a scene description at a specified time point before the second time point. The specified time point prior to the second time point may be set in various ways. For example, the specified time point may be designated as the first time point. In the embodiment of FIG. 4, the specified time point is illustrated as the time point T1, and the first type sample 423 may be described as including a difference command indicating a difference between the scene description 103 at the second time point (time point T3) and the scene description 101 at the time point T1 that is before the second time point.

The second time point and the specified time point which is prior to the second time point and corresponds to scene description information referenced by the first type sample 423 may be set in various ways. According to an embodiment, the second time point and the specified time point may be set such that the difference between the scene description at the second time point and the scene description at the specified time point is less than a designated level. For example, the second time point and the specified time point may be set such that a correlation between the scene description at the second time point and the scene description at the specified time point is greater than a designated level. In various embodiments, whether the difference is less than the designated level or the correlation is greater than the designated level may be determined based on a size of data in the first type sample 423.

According to an embodiment, the second type sample 425 may be associated with a scene description at a third time point after the second time point. Although FIG. 4 shows that the second type sample 425 is associated with the scene description 105 at a time point T5, it is not limited thereto, and may also be associated with a scene description corresponding to another time point after the second time point (e.g., the time point T3) associated with the first type sample 423. According to an embodiment, the second type sample 425 may include a difference command representing a difference between the scene description 105 at the third time point (e.g., the time point T5) and the scene description 103 at the second time point (e.g., the time point T3).

The third time point associated with the second type sample 425 may be set in various ways. According to an embodiment, the third time point may be set such that the difference between the scene description at the third time point and the scene description at the second time point is less than a designated level. For example, the third time point may be set such that a correlation between the scene description at the third time point and the scene description at the second time point is greater than a designated level. In various embodiments, whether the difference is less than the designated level or the correlation is greater than the designated level may be determined based on a size of data in the second type sample 425. According to another embodiment, the third time point may be set such that a difference between the scene description at the third time point and a scene description at a fourth time point (e.g., a time point T7) associated with the third type sample is less than a designated level. For example, the third time point may be set such that a correlation between the scene description at the third time point and the scene description at the fourth time point (e.g., the time point T7) is greater than a designated level.

According to an embodiment, the third type sample 427 may be associated with the scene description at the fourth time point. In the present disclosure, the fourth time point is described as being after the third time point for convenience of description, but the fourth time point may be unrelated to the third time point. For example, the fourth time point may be a time point before the second time point or a time point between the second time point and the third time point. Although FIG. 4 shows that the third type sample 427 is associated with the scene description 107 at the time point T7, it is not limited thereto, and may also be associated with a scene description corresponding to another time point after the third time point (e.g., the time point T5) associated with the second type sample 425. According to an embodiment, the third type sample 427 may include the scene description at the fourth time point (e.g., the time point T7).

The fourth time point associated with the third type sample 427 may be set in various ways. According to an embodiment, the fourth time point may be set such that a difference between the scene description at the fourth time point and the scene description at the specified time point referenced by the first type sample 423 is greater than a designated level. For example, the fourth time point may be set such that a correlation between the scene description at the fourth time point and the scene description at the specified time point is less than a designated level. In various embodiments, whether the difference is greater than the designated level or the correlation is less than the designated level may be determined based on a size of data in the third type sample 427.

Figure 5:
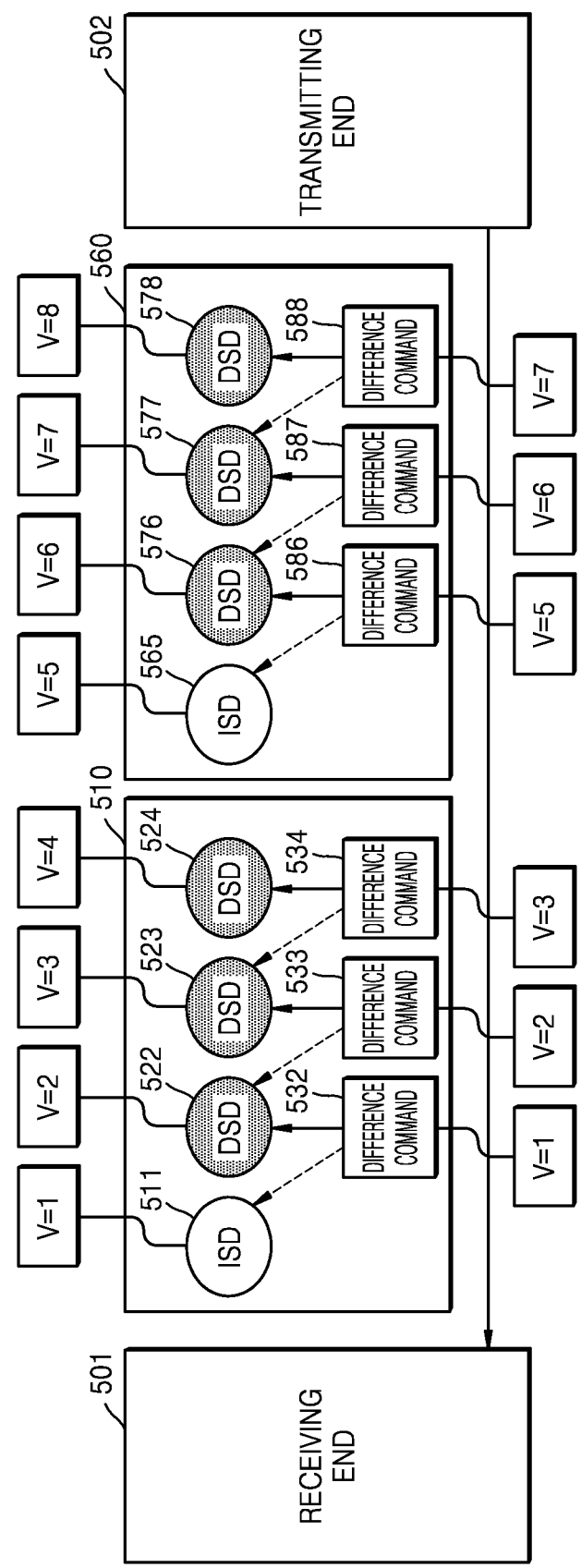
FIG. 5 illustrates a configuration of first track data according to an embodiment.

FIG. 5 illustrates a configuration of first track data according to one embodiment.

Referring to FIG. 5, scene content may be transmitted from a transmitting end 502 to a receiving end 501 via first track data 510 and 560. The transmitting end 502 may be understood as corresponding to a scene content transmitter (e.g., the scene content transmitter 320 of FIG. 3) or a transceiver (e.g., the transceiver 323 of FIG. 3) of the scene content transmitter, and the receiving end 501 may be understood as corresponding to a scene content receiver (e.g., the scene content receiver 310 of FIG. 3) or a transceiver (e.g., the transceiver 313 of FIG. 3) of the scene content receiver.

In various embodiments, there may be one or more pieces of the first track data 510 and 560. For example, the scene content may be separated according to a specified time interval, and the separated scene content may be transmitted via separate pieces of track data. Although the first track data 510 and 560 are shown as two pieces of track data, the number of pieces of first track data 510 and 560 is not limited to that shown in FIG. 5. In addition, although second track data is not shown in FIG. 5, the second track data may also be configured as one or more pieces of track data in the same or similar manner to the first track data 510 and 560. At least some of the description of the first track data 510 and 560 in the description with respect to FIG. 5 may be applied equally or similarly to the second track data.

According to an embodiment, the pieces of first track data 510 and 560 may include a plurality of samples respectively corresponding to a plurality of time points, and each sample may include an ISD 511 or 565 or a difference command 532, 533, 534, 586, 587, or 588. Although FIG. 5 shows that the pieces of first track data 510 and 560 include DSDs 522, 523, 524, 576, 577, and 578, the DSDs 522, 523, 524, 576, 577, and 578 may only be derived at the receiving end 501 based on the ISDs 511 and 565 and the difference commands 532, 533, 534, 586, 587, and 588, but are not included in the pieces of first track data 510 and 560 or transmitted to the receiving end 501 via the pieces of first track data 510 and 560. For example, a V2 version of DSD 522 may only be derived through processing at the receiving end 501 when a V1 version of ISD 511 and a V1 version of difference command 532 are received at the receiving end 501, but is not included in the first track data 510 or transmitted to the receiving end 501 via the first track data 510.

According to an embodiment, the difference commands 532, 533, 534, 586, 587, and 588 and ISDs 511 and 565 included in the pieces of first track data 510 and 560 may each include unique version information. In an embodiment, the plurality of scene descriptions 511, 522, 523, 524, 565, 576, 577, and 578 respectively corresponding to the plurality of time points may each include unique version information. According to an embodiment, unique version information about each of the difference commands 532, 533, 534, 586, 587, and 588 may be set to be the same as version information included in a referenced scene description compared with a scene description at a time point to which the difference command corresponds. For example, unique version information about the difference command 532 may be set to be the same as version information of the ISD 511 which is a referenced scene description compared with the scene description 522 at a time point to which the difference command corresponds. In another example, unique version information about the difference command 533 may be set to be the same as version information about the DSD 522 which is a referenced scene description compared with the scene description 523 at a time point to which the difference command corresponds.

According to an embodiment, when executing the difference commands 532, 533, 534, 586, 587, and 588 at the receiving end 501, an operation of determining whether version information about each of the difference commands 532, 533, 534, 586, 587, and 588 is the same as version information about each of the scene descriptions 511, 522, 523, 565, 576, and 577 to be applied may be performed. Through this, the receiving end 501 may perform the difference commands 532, 533, 534, 586, 587, and 588 only when the corresponding pieces of version information are the same, and generate scene descriptions 522, 523, 524, 576, 577, and 578 to which the difference commands 532, 533, 534, 586, 587, and 588 are respectively applied.

As unique version information about each of the difference commands 532, 533, 534, 586, 587, and 588 is set as described above, a scene description to which the corresponding difference command 532, 533, 534, 586, 587, or 588 is to be applied may be clearly specified. Furthermore, by doing so, the receiving end 501 may determine whether an error has occurred in the scene descriptions (i.e., DSDs) derived by respectively applying the difference commands 532, 533, 534, 586, 587, and 588, or whether packet loss or error has occurred during transmission of the track data.

Figure 6:
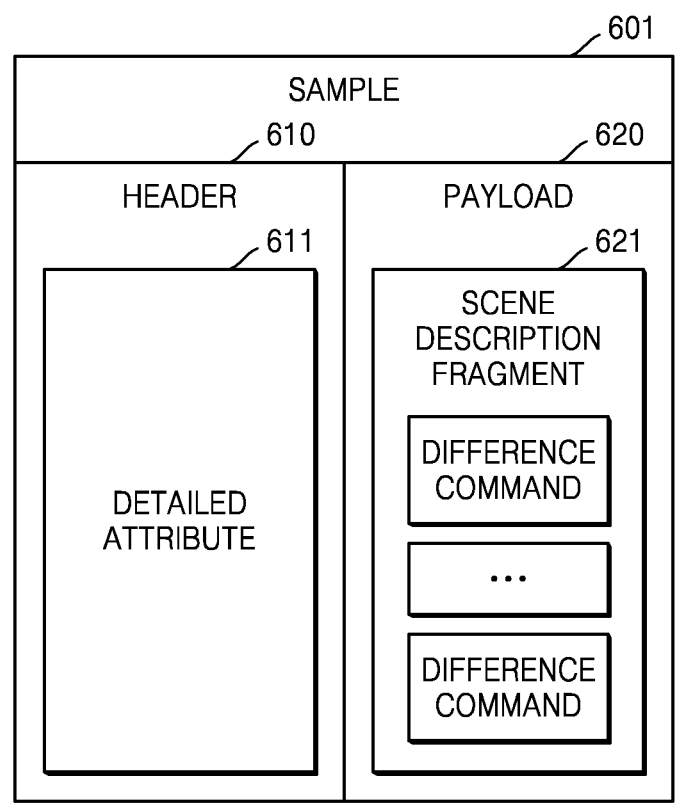
FIG. 6 illustrates a structure of a sample, according to an embodiment.

FIG. 6 illustrates a structure of a sample, according to an embodiment.

Referring to FIG. 6, a sample 601 may include a header 610 and a payload 620. In various embodiments, the header 610 may be understood as supplementary data located at the beginning of the sample 601, and the payload 620 may be understood as data located after the header 610, which is the primary purpose of transmitting the sample 601.

According to an embodiment, the header 610 may include a detailed attribute 611. The detailed attribute 611 may include, for example, at least one of an identification (ID), a presentation timestamp (PTS), a duration, a reference type (refType), and a reference ID (refID). Each sample 601 may have the detailed attribute 611 set, and may be differentiated according to the set detailed attribute 611. According to various embodiments, the names of attributes included in the detailed attribute 611 may be different from those described above.

In an embodiment, an ID may be understood as a unique ID number that each sample 601 has, and different samples may have IDs set to different values.

In an embodiment, PTS may represent a time difference from a first sample. For example, if the first sample corresponds to a time point T0, a PTS of a sample corresponding to a time point T2 may be set to T2-T0.

In an embodiment, a duration may refer to a time difference from the immediately following sample. For example, if a sample immediately following a sample corresponding to a time point T1 corresponds to the time point T2, a PTS of the sample at the time point T2 may be understood as being equal to a sum of a PTS of the sample at the time point T1 and a duration of the sample at the time point T1.

In an embodiment, refType may refer to a method used by a sample to reference another sample and indicate a relationship between the sample and the referenced sample. An attribute value of refType may include at least one of ISD, dependent to sample (DS), dependent to entry (DE), or dependent with no update (DN).

In an embodiment, if the attribute value of refType is ISD, the corresponding sample may include an ISD. A scene content receiver may temporarily store the sample after using it and use it again when deriving another sample that references the sample.

In an embodiment, if the attribute value of refType is DS, it may be understood that the sample is dependent on a previous sample and includes a change history compared to the previous sample. If the sample references a sample other than the previous sample, the referenced sample may be represented by a value set in refID.

In an embodiment, if the attribute value of refType is DE, it may be understood that the corresponding sample is dependent on an entry item in a track data (or track metadata) area and includes a change history compared to the entry item. In this case, the entry item referenced by the sample may be represented by a value set in refID. That is, in this case, refID may be set to an entry ID.

In an embodiment, if the attribute value of refType is DN, it may be understood that the corresponding sample is dependent on the previous sample and has no change history compared to the previous sample. In other words, a scene description corresponding to the sample may be understood as being the same as a scene description corresponding to the sample referenced by the sample. If the sample references a sample other than the previous sample, the referenced sample may be represented by a value set in refID. When receiving the sample, the scene content receiver may use the scene description corresponding to its referenced sample as is at a time point corresponding to the sample.

According to an embodiment, the payload 620 may include a scene description or a scene description fragment 621. That is, if the refType is ISD, the payload may include the corresponding a scene description, and if the refType is DS, DE, or DN, the payload may include the scene description fragment 621. The scene description fragment 621 may or may not include a difference command. For example, if the refType is DN, the scene description fragment 621 may not include a difference command, and if the refType is DS or DE, the scene description fragment 621 may include one or more difference commands.

In various embodiments, a difference command may be understood as an editorial instruction that can be applied to referenced scene description to generate corresponding a scene description through document comparison. In various embodiments, one difference command may include detailed information such as an operation such as add, modify, delete, etc., a target (e.g., line number, node order, node ID, etc.) on which the operation is to be performed, or specific details about the operation (e.g., changed attribute value). Difference commands may be executed in the order stated, and all difference commands within a sample may be executed in full.

Figure 7:
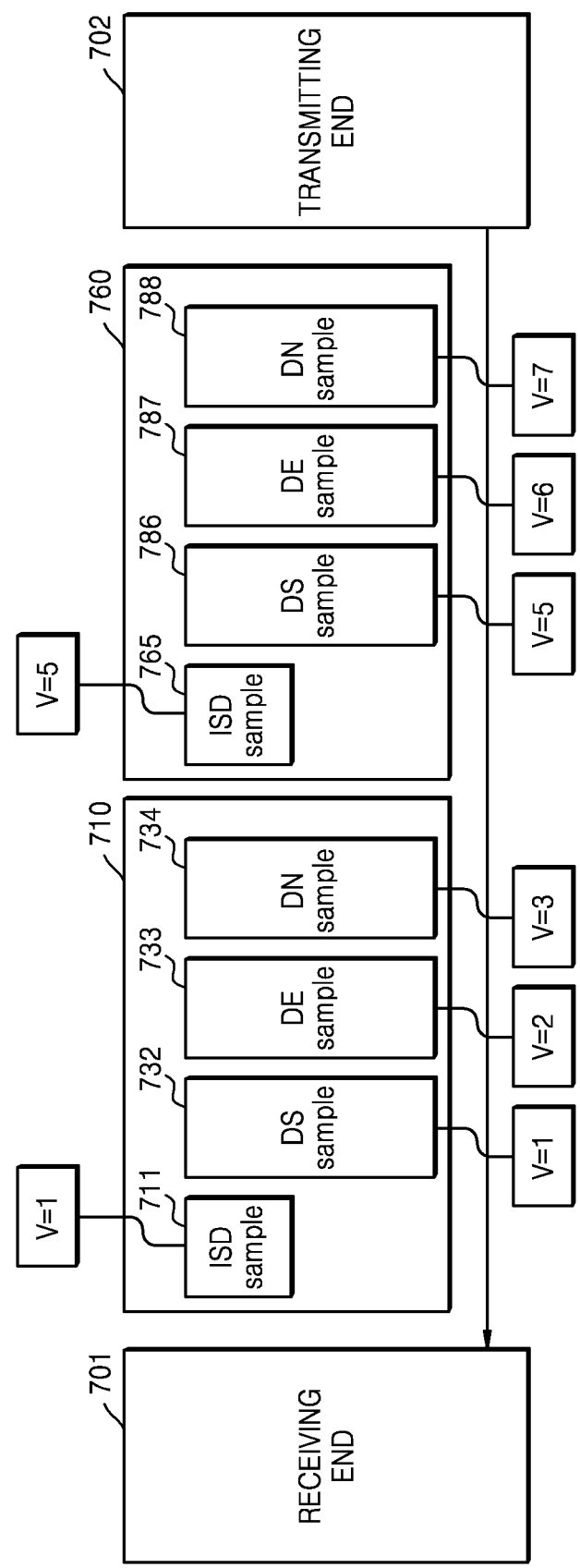
FIG. 7 illustrates a detailed attribute for a configuration of first track data, according to an embodiment.

FIG. 7 illustrates a detailed attribute for a configuration of first track data, according to an embodiment.

Referring to FIG. 7, there may be one or more pieces of first track data 710 and 760 transmitted from a transmitting end 702 to a receiving end 701, and the pieces of first track data 710 and 760 may include a plurality of samples 711, 732, 733, 734, 765, 786, 787 and 788. In an embodiment, the transmitting end 702 may be understood as a scene content transmitter (e.g., the scene content transmitter 320 of FIG. 3) or a transceiver of the scene content transmitter (e.g., the transceiver 323 of FIG. 3), and the receiving end may be understood as a scene content receiver (e.g., the scene content receiver 310 of FIG. 3) or a transceiver of the scene content receiver (e.g., the transceiver 313 of FIG. 3).

According to an embodiment, the first track data 710 may include a first sample 711, a second sample 732, a third sample 733, and a fourth sample 734. In an embodiment, refType of the first sample 711 is ISD, and the first sample 711 may include an ISD. In an embodiment, refType of the second sample 732 is DS, and the second sample 732 may correspond to a DSD that is dependent on the first sample 711 unless a refID is additionally set. The receiving end 701 may derive the corresponding a DSD by using the first sample 711 and the second sample 732. In an embodiment, refType of the third sample 733 is DE, and the third sample 733 may correspond to a DSD that is dependent on an entry item determined based on an entry ID of a referenced entry item. In an embodiment, refType of the fourth sample 734 may be DN, and the fourth sample 734 may correspond to the same a scene description as a scene description corresponding to the third sample 733 unless a refID is additionally set.

Figure 8:
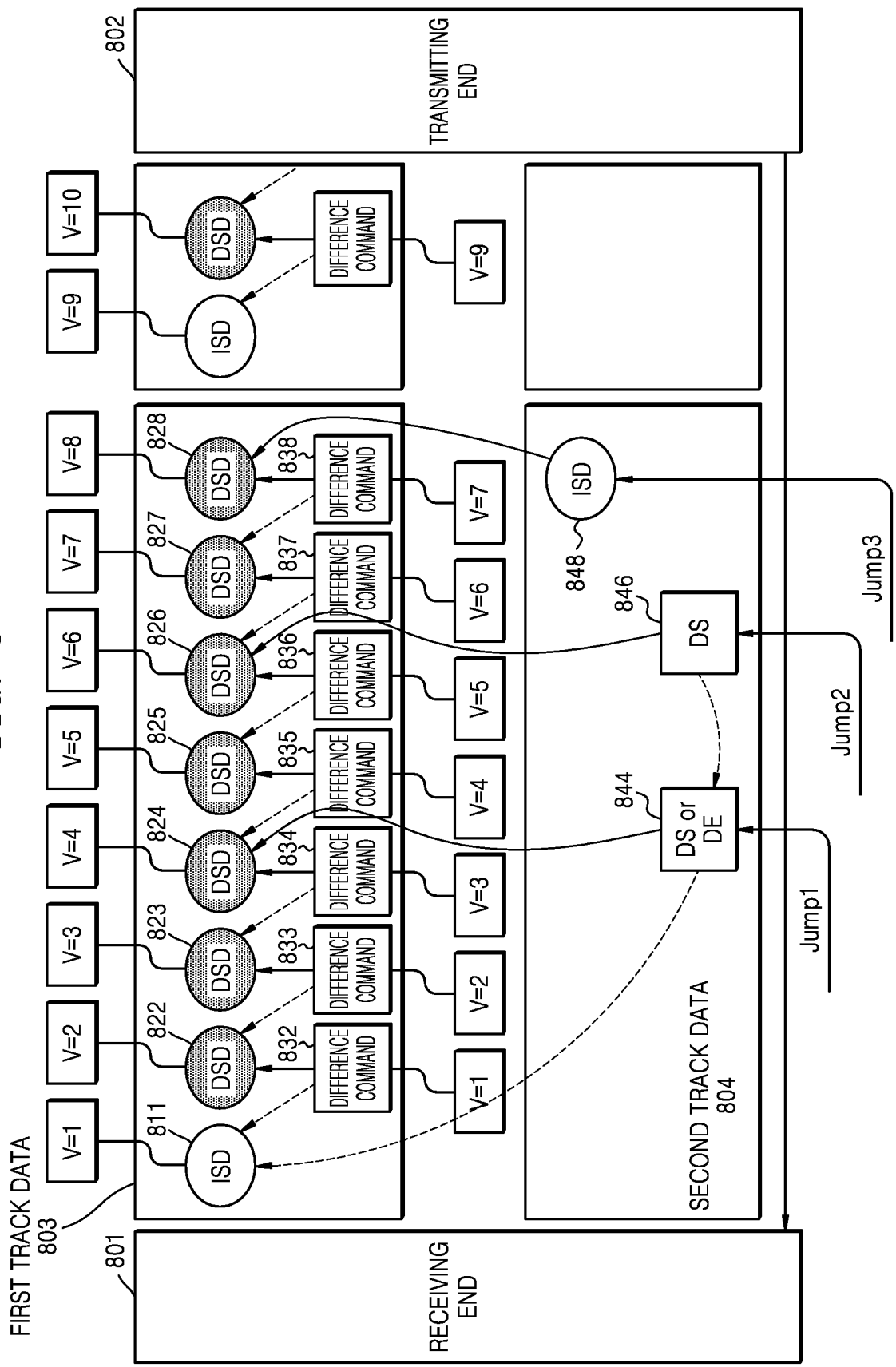
FIG. 8 illustrates configurations of first track data and second track data, according to an embodiment.

FIG. 8 illustrates configurations of first track data and second track data, according to an embodiment.

Referring to FIG. 8, scene content may be transmitted from a transmitting end 802 to a receiving end 801 through first track data 803 and second track data 804. The transmitting end 802 may be understood as corresponding to a scene content transmitter (e.g., the scene content transmitter 320 of FIG. 3) or a transceiver of the scene content transmitter (e.g., the transceiver 323 of FIG. 3), and the receiving end 801 may be understood as corresponding to a scene content receiver (e.g., the scene content receiver 310 of FIG. 3) or a transceiver of the scene content receiver (e.g., the transceiver 313 of FIG. 3).

According to an embodiment, the first track data 803 may include a plurality of samples respectively corresponding to a plurality of time points, and each sample may include an ISD 811 or a difference command 832, 833, 834, 835, 836, 837 or 838. In an embodiment, a time point corresponding to the ISD 811 may be referred to as a first time point. Although FIG. 8 shows that the first track data 803 includes DSDs 822, 823, 824, 825, 826, 827 and 828, the DSDs 822, 823, 824, 825, 826, 827 and 828 may only be derived at the receiving end 801 based on the ISD 811 and the difference commands 832, 833, 834, 835, 836, 837 and 838, but are not included in the first track data 803 or transmitted to the receiving end 801 via the first track data 803. For example, a V2 version of DSD 822 may only be derived through processing at the receiving end 801 when a V1 version of ISD 811 and a V1 version of difference command 832 are received at the receiving end 801, but is not included in the first track data 803 or transmitted to the receiving end 801 via the first track data 803.

According to an embodiment, the second track data 804 may include a plurality of samples respectively corresponding to some of the plurality of time points. The second track data 804 may include a first type sample 844, a second type sample 846, and a third type sample 848. The second track data 804 may include samples at a lower frequency than the first track data 803. In an embodiment, a time point to which the first type sample 844 corresponds may be referred to as a second time point, and in the description of FIG. 8, the second time point may be a time point to which a V4 version of scene description 824 corresponds. In an embodiment, a time point to which the second type sample 846 corresponds may be referred to as a third time point, and in the description of FIG. 8, the third time point may be a time point to which a V6 version of scene description 826 corresponds. In an embodiment, a time point to which the third type sample 848 corresponds may be referred to as a fourth time point, and in the description of FIG. 8, the fourth time point may be a time point to which a V8 version of scene description 828 corresponds. Additionally, in the description of FIG. 8, for convenience of description, the fourth time point is shown and described as a time point after the third time point, but it is not limited thereto.

According to an embodiment, the receiving end 801 may receive the first track data 803 and the second track data 804, and play scene content at an arbitrary time point based on the received first track data 803 and second track data 804. In an embodiment, when an arbitrary time point for starting playback is specified, the receiving end 801 may determine, from among the samples included in the second track data 804, a sample corresponding to a time point that is closest to and precedes the specified arbitrary time point. The receiving end 801 may derive a scene description at the arbitrary time point based on the determined sample.

For example, if the arbitrary time point is specified as a time point between the second and third time points, the receiving end 801 may derive a scene description at the specified arbitrary time point by using at least the first type sample 844. In another example, if the arbitrary time point is specified as a time point between the third and fourth time points, the receiving end 801 may derive a scene description at the specified arbitrary time point by using at least the second type sample 846. In this case, if the second type sample 846 refers to the first type sample 844, the receiving end 801 may derive a scene description at the specified arbitrary time point by using at least the first type sample 844 and the second type sample 846. In another example, if the arbitrary time point is specified as a time point after the fourth time point, the receiving end 801 may derive a scene description at the specified arbitrary time point by using at least the third type sample 848.

According to an embodiment, if the arbitrary time point is specified as a time point between the second time point and the third time point, the receiving end 801 may access and read the first type sample 844 as indicated by Jump1 of FIG. 8. In an embodiment, the first type sample 844 may have a refType of DS or DE. The first type sample 844 may reference another sample if the refType is DS, and reference a track data (or track metadata) entry item if the refType is DE. In an embodiment, if the first type sample 844 refers to a sample including the ISD 811 in the first track data 803 as shown in FIG. 8, the receiving end 801 may obtain the V4 version of scene description 824 by using the sample including the ISD 811 and the first type sample 844. If the arbitrary time point is later than the time point corresponding to the V4 version, the receiving end 801 may obtain a scene description at the arbitrary time point by using the obtained V4 version of scene description 824 and one or more difference commands in the first track data 803.

According to an embodiment, if the arbitrary time point is determined as a time point between the third time point and the fourth time point, the receiving end 801 may access and read the second type sample 846 as indicated by Jump2 of FIG. 8. In an embodiment, the second type sample 846 may have a refType of DS. The second type sample 846 may refer to the first type sample 844. In an embodiment, the receiving end 801 may obtain the V6 version of scene description 826 by using the second type sample 846, the first type sample 844, and the sample including the ISD 811 referenced by the first type sample 844. If the arbitrary time point is later than the time point corresponding to the V6 version, the receiving end 801 may obtain a scene description at the arbitrary time point by using the obtained V6 version of scene description 826 and one or more difference commands in the first track data 803.

According to an embodiment, if the arbitrary time point is specified as a time point after the fourth time point, the receiving end 801 may access and read the third type sample 848 as indicated by Jump3 of FIG. 8. In an embodiment, the third type sample 848 may have a refType of ISD. The third type sample 848 may include an ISD, e.g., the V8 version of scene description 828. In an embodiment, the receiving end 801 may obtain the V8 version of scene description 828 by using the third type sample 848. If the arbitrary time point is later than the time corresponding to the V8 version, the receiving end 801 may obtain a scene description at the arbitrary time point by using the obtained V8 version of scene description 828 and one or more difference commands in the first track data 803.

According to an embodiment, a mismatch in version information about a difference command may occur while the receiving end 801 is playing the scene content from an arbitrary time point. In this case, the receiving end 801 may read a sample in the second track data 804, having a PTS closest to a PTS of a sample currently being played. By doing so, the receiving end 801 may efficiently resume playback of the scene content. In this case, because the second track data 804 is derived from the sample in the first track data 803, version information about the first type sample 844 may be used as version information about the derived scene description.

Figure 9:
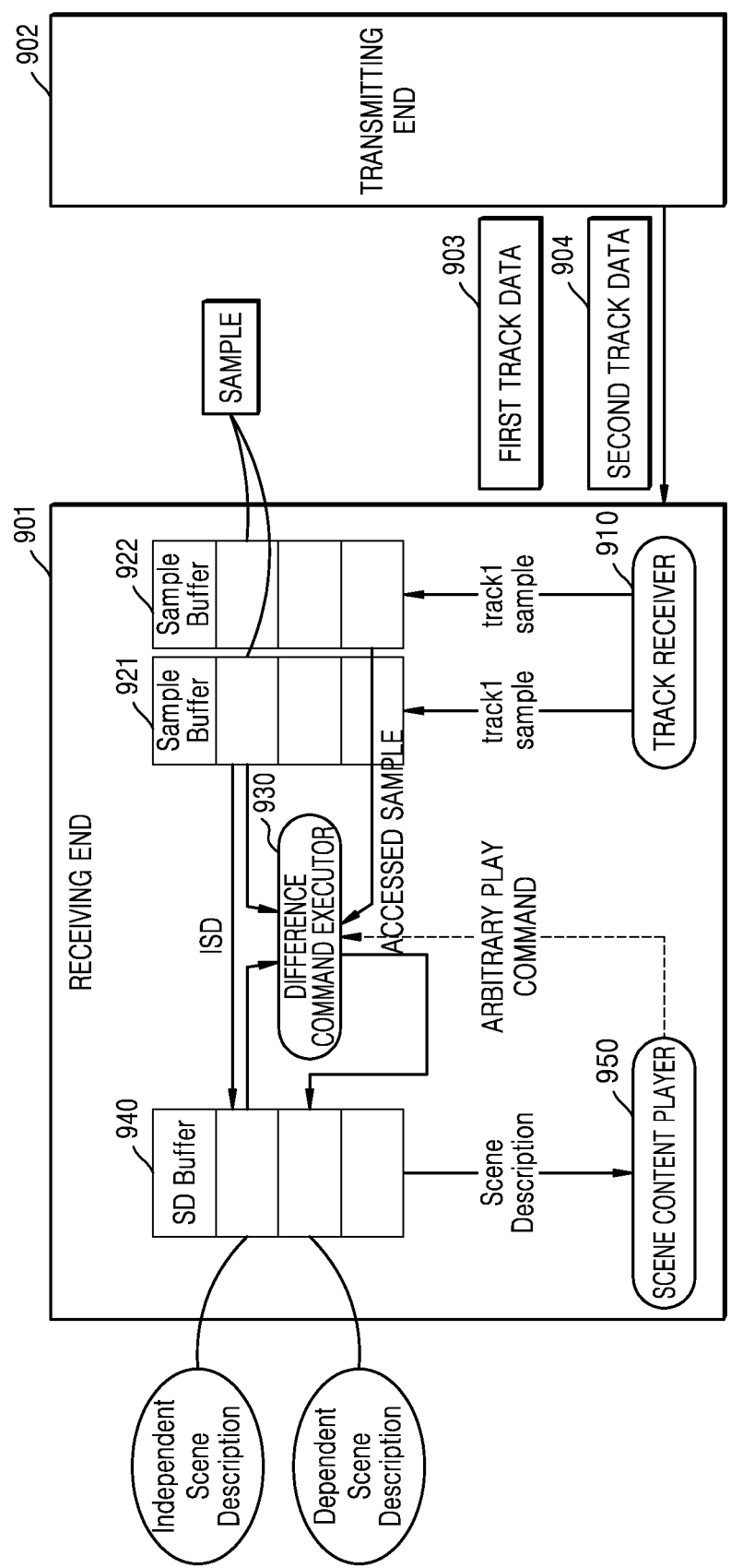
FIG. 9 illustrates a method, performed by a scene content receiver, of receiving first track data and second track data and playing scene content, according to an embodiment.

FIG. 9 illustrates a method, performed by a scene content receiver, of receiving first track data and second track data and playing scene content, according to an embodiment.

Referring to FIG. 9, scene content may be transmitted from a transmitting end 902 to a receiving end 901 via first track data 903 and second track data 904. The transmitting end 902 may be understood as corresponding to a scene content transmitter (e.g., the scene content transmitter 320 of FIG. 3) or a transceiver of the scene content transmitter (e.g., the transceiver 323 of FIG. 3), and the receiving end 901 may be understood as corresponding to a scene content receiver (e.g., the scene content receiver 310 of FIG. 3) or a transceiver of the scene content receiver (e.g., the transceiver 313 of FIG. 3).

According to an embodiment, the receiving end 901 may include a track receiver 910, a first sample buffer 921, a second sample buffer 922, a difference command executor 930, an SD buffer 940, and a scene content player 950. According to various embodiments, a configuration of the receiving end 901 is not limited to that illustrated in FIG. 9.

According to an embodiment, the track receiver 910 may receive the first track data 903 and the second track data 904, and sequentially store each track data in the first sample buffer 921 and the second sample buffer 922. In various embodiments, the first sample buffer 921 and the second sample buffer 922 may be implemented as a single buffer.

According to an embodiment, an ISD stored in the first sample buffer 921 may be stored in the SD buffer 940. In an embodiment, the difference command executor 930 may sequentially derive scene descriptions by using the ISD and difference commands stored in the first sample buffer 921 or the second sample buffer 922, and store the derived scene descriptions in the SD buffer 940.

According to an embodiment, the scene content player 950 may transmit an arbitrary play command to the difference command executor 930. An arbitrary play command may mean, for example, a command to specify an arbitrary time point and play scene content from the specified arbitrary time point. In an embodiment, the difference command executor 930 may read, in response to the arbitrary play command, a sample corresponding to the specified arbitrary time point from the second sample buffer 922 in which samples in the second track data 904 are stored. For example, as described with reference to FIG. 8, the difference command executor 930 may read, based on an arbitrary time point, one of first sample data, second sample data, and third sample data included in the second track data 904. The difference command executor 930 may store a scene description corresponding to the arbitrary time point in the SD buffer 940 and sequentially store scene descriptions corresponding to subsequent time points in the SD buffer 940.

According to an embodiment, the scene content player 950 may play scene descriptions stored in the SD buffer 940. Through this, the receiving end 901 may play scene content from an arbitrary time point.

According to an embodiment, if samples with refTypes of DS, DE, and DN are sequentially received as shown in FIG. 7, the SD buffer 940 may store both an ISD type scene description and continuously increasing versions of scene descriptions. To efficiently manage the SD buffer 940, the following method may be used.

According to an embodiment, when a new sample containing a new ISD, i.e., a new sample whose refType is an ISD, is received, the SD buffer 940 may delete scene descriptions included in samples preceding the new sample. For example, initialization of the SD buffer 940 according to the arrival of a sample of ISD type may be explicitly specified in a header of track data or a header of a transmission unit, or a rule may be defined that semantics of ISD indicates initialization of the SD buffer 940.

According to an embodiment, in order to play scene content at an arbitrary time point, the same number of samples as dependent layers applied at the corresponding time point may need to be processed. The number of dependent layers may mean the number of times samples related to a DSD refer to other samples when the samples related to the DSD arrive after a sample of an ISD type. For example, the number of dependent layers for a sample of an ISD type may be 0, the number of dependent layers for a sample referencing the sample of the ISD type may be 1, and the number of dependent layers of a sample referencing the sample for which the number of dependent layers is 1 may be 2. If the number of dependent layers for a sample is n at a certain time point, n+1 other samples may need to be sequentially read and applied to derive a scene description needed at the corresponding time point.

In order to start playback from an arbitrary time point, the same number of samples as dependent layers for a sample may all need to be processed. According to an embodiment of the present disclosure, when using second track data including a first type sample, a second type sample, and a third type sample, the number of dependent layers in the process of transmitting scene content may be reduced.

Figure 10:
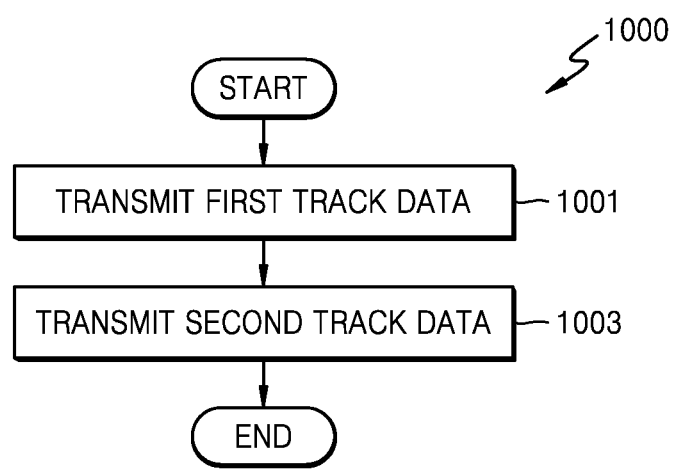
FIG. 10 is a flowchart of a method, performed by a scene content transmitter, of processing scene content, according to an embodiment.

FIG. 10 is a flowchart of a method, performed by a scene content transmitter, of processing scene content, according to an embodiment.

Referring to FIG. 10, a method 1000, performed by a scene content transmitter, of processing scene content may include operations 1001 and 1003. According to various embodiments, it may be understood that operations 1001 and 1003 are performed by the processor 321 of the scene content transmitter 320 shown in FIG. 3.

In operation 1001, the scene content transmitter may transmit first track data included in track data to the scene content receiver. The first track data may consist of a first sample including a scene description at a first time point and a plurality of samples respectively corresponding to a plurality of time points after the first time point. In an embodiment, each of the plurality of samples may include a difference command representing a difference between a scene description at a corresponding time point and a scene description at a time point immediately preceding the corresponding time point.

In operation 1003, the scene content transmitter may transmit second track data included in the track data to a scene content receiver. The second track data may include a first type sample associated with a scene description at a second time point after the first time point, a second type sample associated with a scene description at a third time point after the second time point, and a third type sample associated with a scene description at a fourth time point. In an embodiment, the first type sample may include a difference command indicating a difference between a specified scene description and a scene description at the second time point. The specified scene description may be either the scene description at the first time point or an entry item in the track data. In an embodiment, the second type sample may include a difference command indicating a difference between the scene description at the second time point and the scene description at the third time point. In an embodiment, the third type sample may include the scene description at the fourth time point.

Figure 11:
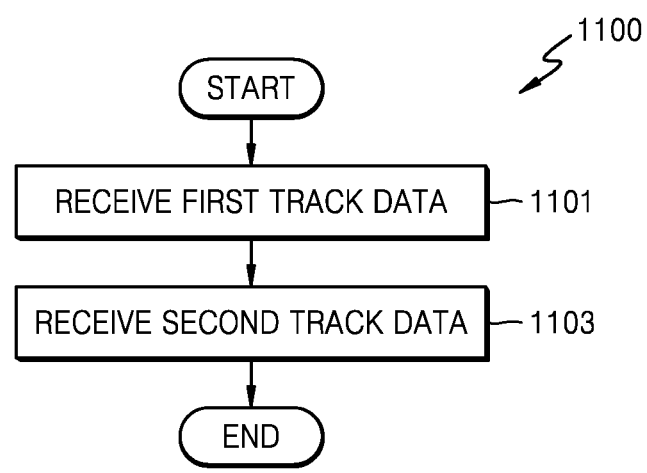
FIG. 11 is a flowchart of a method, performed by a scene content receiver, of processing scene content, according to an embodiment.

FIG. 11 is a flowchart of a method, performed by a scene content receiver, of processing scene content, according to an embodiment.

Referring to FIG. 11, a method 1100, performed by a scene content receiver, of processing scene content may include operations 1101 and 1103. According to various embodiments, it may be understood that operations 1101 and 1103 are performed by the processor 311 of the scene content receiver 310 shown in FIG. 3.

In operation 1101, the scene content receiver may receive first track data from the scene content transmitter. The first track data may consist of a first sample including a scene description at a first time point and a plurality of samples respectively corresponding to a plurality of time points after the first time point. In an embodiment, each of the plurality of samples may include a difference command representing a difference between a scene description at a corresponding time point and a scene description at a time point immediately preceding the corresponding time point.

In operation 1103, the scene content receiver may receive second track data from the scene content transmitter. The second track data may include a first type sample associated with a scene description at a second time point after the first time point, a second type sample associated with a scene description at a third time point after the second time point, and a third type sample associated with a scene description at a fourth time point. In an embodiment, the first type sample may include a difference command indicating a difference between a specified scene description and a scene description at the second time point. The specified scene description may be either the scene description at the first time point or an entry item in the track data. In an embodiment, the second type sample may include a difference command indicating a difference between the scene description at the second time point and the scene description at the third time point. In an embodiment, the third type sample may include the scene description at the fourth time point.

FIG. 12 is a diagram illustrating the effects of methods of processing scene content, according to an embodiment.

Referring to FIG. 12, results of processing scene content for the same scene content according to a first comparative example, a second comparative example, and a first embodiment are respectively shown. The first comparative example corresponds to the method of processing scene content as described with reference to FIG. 1A, and the second comparative example corresponds to the method of processing scene content as described with reference to FIG. 1B. The first embodiment may be understood as corresponding to, for example, the method of processing scene content as described with reference to FIG. 4 or FIG. 8.

According to the first embodiment, a total size of data transferred is 32, which is 61% of 53 that is a data size of the entire scene content. Furthermore, because a size of data transferred is 38 in the first comparative example and a size of data transferred is 40 in the second comparative example, the total data size in the first embodiment is 84% of the data size in the first comparative example and 80% of the data size in the second comparative example. That is, it can be seen that according to the first embodiment, scene content may be transmitted more efficiently than in the first comparative example and the second comparative example.

As described above, if multiple attribute values of refType are available and appropriate refType and payload are provided according to the content of a scene description for each frame, a size of the required transmission bandwidth may be reduced and transmission efficiency may be increased. A scene content transmitter according to the present disclosure may transmit scene content via first track data and second track data. In this case, the first track data may include a difference command indicating a difference from a scene description at a preceding time point, and the second track data may include the first type sample, the second type sample, and the third type sample described above. The scene content transmitter may appropriately configure detailed attributes of the first type sample, second type sample, and third type sample so as to reduce a data size and the number of layers for reference.

A method, performed by a scene content transmitter, of processing scene content, according to an embodiment of the present disclosure, may include transmitting, to a scene content receiver, first track data included in track data associated with a plurality of scene descriptions constituting the scene content, wherein the first track data includes a first sample including a scene description at a first time point and a plurality of samples respectively corresponding to a plurality of time points after the first time point, and transmitting, to the scene content receiver, second track data included in the track data, wherein the second track data includes a first type sample associated with a scene description at a second time point after the first time point, a second type sample associated with a scene description at a third time point after the second time point, and a third type sample associated with a scene description at a fourth time point. The plurality of samples may respectively include difference commands, each difference command indicating a difference between a scene description at a corresponding time point and a scene description at a time point immediately preceding the corresponding time point, the first type sample may include a difference command indicating a difference between a specified scene description and the scene description at the second time point, the second type sample may include a difference command indicating a difference between the scene description at the second time point and the scene description at the third time point, and the third type sample may include the scene description at the fourth time point.

According to an embodiment, the specified scene description may be one of the scene description at the first time point or an entry item in the track data.

According to an embodiment, each of the difference commands respectively included in the plurality of samples, the first type sample, and the second type sample may include unique version information, and the unique version information may be set to be the same as version information included in a referenced scene description compared with a scene description at a time point to which the difference command corresponds.

According to an embodiment, the first track data and the second track data may be used by the scene content receiver to access a scene description at an arbitrary time point for playing the scene content from the arbitrary time point.

According to an embodiment, the scene content receiver may be configured to access the scene description at the arbitrary time point by using a sample in the second track data, corresponding to a time point that precedes and is closest to the arbitrary time point from among the second time point, the third time point, and the fourth time point.

According to an embodiment, the second time point may be set such that the difference between the specified scene description and the scene description at the second time point is less than a designated level.

According to an embodiment, the third time point may be set such that the difference between the scene description at the second time point and the scene description at the third time point is less than a designated level.

According to an embodiment, the third time point may be set such that the difference between the scene description at the third time point and the scene description at the fourth time point is less than a designated level.

According to an embodiment, the fourth time point may be set such that a difference between the scene description at the specified time point and the scene description at the fourth time point is greater than a designated level.

A method, performed by a scene content receiver, of processing scene content, according to an embodiment of the present disclosure, may include receiving, from a scene content transmitter, first track data included in track data associated with a plurality of scene descriptions constituting the scene content, wherein the first track data includes a first sample including a scene description at a first time point and a plurality of samples respectively corresponding to a plurality of time points after the first time point, and receiving, from the scene content transmitter, second track data included in the track data, wherein the second track data includes a first type sample associated with a scene description at a second time point after the first time point, a second type sample associated with a scene description at a third time point after the second time point, and a third type sample associated with a scene description at a fourth time point. The plurality of samples may respectively include difference commands, each difference command indicating a difference between a scene description at a corresponding time point and a scene description at a time point immediately preceding the corresponding time point, the first type sample may include a difference command indicating a difference between a specified scene description and the scene description at the second time point, the second type sample may include a difference command indicating a difference between the scene description at the second time point and the scene description at the third time point, and the third type sample may include the scene description at the fourth time point.

According to an embodiment, the specified scene description may be one of the scene description at the first time point or an entry item in the track data.

According to an embodiment, each of the difference commands respectively included in the plurality of samples, the first type sample, and the second type sample may include unique version information, and the unique version information may be set to be the same as version information included in a referenced scene description compared with a scene description at a time point to which the difference command corresponds.

According to an embodiment, the method may further include accessing a scene description information at an arbitrary time point by using the first track data and the second track data in order to play the scene content from the arbitrary time point.

According to an embodiment, the method may further include accessing the scene description at the arbitrary time point by using a sample in the second track data, corresponding to a time point that precedes and is closest to the arbitrary time point from among the second time point, the third time point, and the fourth time point.

According to an embodiment, the second time point may be set such that the difference between the scene description at the specified time point and the scene description at the second time point is less than a designated level.

According to an embodiment, the third time point may be set such that the difference between the scene description at the second time point and the scene description at the third time point is less than a designated level.

According to an embodiment, the third time point may be set such that the difference between the scene description at the third time point and the scene description at the fourth time point is less than a designated level.

According to an embodiment, the fourth time point may be set such that a difference between the scene description at the specified time point and the scene description at the fourth time point is greater than a designated level.

A scene content transmitter for processing scene content according to an embodiment of the present disclosure may include a transceiver and at least one processor electrically coupled to the transceiver and configured to transmit, to a scene content receiver, first track data included in track data associated with a plurality of scene descriptions constituting the scene content, wherein the first track data includes a first sample including a scene description at a first time point and a plurality of samples respectively corresponding to a plurality of time points after the first time point, and transmit, to the scene content receiver, second track data included in the track data, wherein the second track data includes a first type sample associated with a scene description at a second time point after the first time point, a second type sample associated with a scene description at a third time point after the second time point, and a third type sample associated with a scene description at a fourth time point. The plurality of samples may respectively include difference commands, each difference command indicating a difference between a scene description at a corresponding time point and a scene description at a time point immediately preceding the corresponding time point, the first type sample may include a difference command indicating a difference between a specified scene description and the scene description at the second time point, the second type sample may include a difference command indicating a difference between the scene description at the second time point and the scene description at the third time point, and the third type sample may include the scene description at the fourth time point.

According to an embodiment, the specified scene description may be one of the scene description at the first time point or an entry item in the track data.

The invention claimed is:

1. A method, performed by a scene content transmitter, of processing scene content, the method comprising:
   transmitting, to a scene content receiver, at least one track data associated with a plurality of scene descriptions constituting the scene content,
   wherein the at least one track data comprises a first sample associated with a scene description at a first time point and a second sample associated with a scene description at a second time point,
   wherein a header of the second sample includes information related to a reference type identifying a referenced target sample on which the second sample is based, and
   wherein based on the referenced target sample and the second sample, the scene description at the second time point is obtained.

2. The method of claim 1, wherein the second time point is consecutive to the first time point,
   wherein the information related to the reference type identifying the referenced target sample on which the second sample is based, and indicates that the second sample refers to the first sample corresponding to the first time point that is a time point prior to the second time point, and
   wherein based on the first sample, corresponding to the first time point that is the time point prior to the second time point, and the second sample, the scene description at the second time point is obtained.

3. The method of claim 1, wherein the scene description at the first time point, which is associated with the first sample, is an independent scene description (ISD),
   wherein the information related to the reference type identifying the referenced target sample on which the second sample is based indicates that the second sample refers to the first sample associated with the scene description at the first time point, which is the ISD, and
   wherein based on the first sample, associated with the ISD, and the second sample, the scene description at the second time point is obtained.

4. The method of claim 3, wherein at least one time point associated with at least one scene description exists between the first time point and the second time point.

5. A method, performed by a scene content receiver, of processing scene content, the method comprising receiving, from a scene content transmitter, at least one track data associated with a plurality of scene descriptions constituting the scene content,
  wherein the at least one track data comprises a first sample associated with a scene description at a first time point and a second sample associated with a scene description at a second time point, and
  wherein a header of the second sample includes information related to a reference type identifying a referenced target sample on which the second sample is based; and
based on the referenced target sample and the second sample, obtaining the scene description at the second time point.

6. The method of claim 5, wherein the second time point is consecutive to the first time point,
  wherein the information related to the reference type identifying the referenced target sample on which the second sample is based indicates that the second sample refers to the first sample corresponding to the first time point that is a time point prior to the second time point, and
  wherein based on the first sample, corresponding to the first time point that is the time point prior to the second time point, and the second sample, obtaining the scene description at the second time point.

7. The method of claim 5, wherein the scene description at the first time point, which is associated with the first sample, is an independent scene description (ISD), and the information related to the reference type identifying the referenced target sample on which the second sample is based indicates that the second sample refers to the first sample associated with the scene description at the first time point, which is the ISD, and
  wherein the scene description at the second time point is obtained further based on the first sample associated with the ISD and the second sample.

8. The method of claim 7, wherein at least one time point associated with at least one scene description exists between the first time point and the second time point.

9. A scene content transmitter for processing scene content, the scene content transmitter comprising:
  a transceiver; and
  at least one processor electrically coupled to the transceiver and configured to transmit, to a scene content receiver, at least one track data associated with a plurality of scene descriptions constituting the scene content,
  wherein the at least one track data comprises a first sample associated with a scene description at a first time point and a second sample associated with a scene description at a second time point,
  wherein a header of the second sample includes information related to a reference type identifying a referenced target sample on which the second sample is based, and
  wherein based on the referenced target sample and the second sample, the scene description at the second time point is obtained.

10. The scene content transmitter of claim 9, wherein the second time point is consecutive to the first time point,
  wherein the information related to the reference type identifying the referenced target sample on which the second sample is based indicates that the second sample refers to the first sample corresponding to the first time point that is a time point prior to the second time point, and
  wherein based on the first sample corresponding to the first time point that is the time point prior to the second time point, and the second sample, the scene description at the second time point is obtained.

11. The scene content transmitter of claim 9, wherein the scene description at the first time point, which is associated with the first sample, is an independent scene description (ISD),
  wherein the information related to the reference type identifying the referenced target sample on which the second sample is based indicates that the second sample refers to the first sample associated with the scene description at the first time point, which is the ISD, and
  wherein based on the first sample associated with the ISD, and the second sample, the scene description at the second time point is obtained.

12. The scene content transmitter of claim 11, wherein at least one time point associated with at least one scene description exists between the first time point and the second time point.

13. A scene content receiver for processing scene content, the scene content receiver comprising:
  a transceiver; and
  at least one processor electrically coupled to the transceiver and configured to:
  receive, from a scene content transmitter, at least one track data associated with a plurality of scene descriptions constituting the scene content,
  wherein the at least one track data comprises a first sample associated with a scene description at a first time point and a second sample associated with a scene description at a second time point,
  wherein a header of the second sample includes information related to a reference type identifying a referenced target sample on which the second sample is based, and
  wherein based on the referenced target sample and the second sample, obtain the scene description at the second time point.

14. The scene content receiver of claim 13, wherein the second time point is consecutive to the first time point,
  wherein the information related to the reference type identifying the referenced target sample on which the second sample is based indicates that the second sample refers to the first sample corresponding to the first time point that is a time point prior to the second time point, and
  wherein the at least one processor is further configured to, based on the first sample corresponding to the first time point that is the time point prior to the second time point, and the second sample, obtain the scene description at the second time point.

15. The scene content receiver of claim 13, wherein the scene description at the first time point, which is associated with the first sample, is an independent scene description (ISD),
  wherein the information related to the reference type identifying the referenced target sample on which the second sample is based indicates that the second sample refers to the first sample associated with the scene description at the first time point, which is the ISD, and
  wherein the at least one processor further configured to, based on the first sample associated with the ISD, and the second sample, obtain the scene description at the second time point.

* * * * *